US007979508B1

(12) United States Patent
Lamberton et al.

(10) Patent No.: US 7,979,508 B1
(45) Date of Patent: Jul. 12, 2011

(54) SYSTEM AND METHOD FOR IMPROVING GATEWAY TRANSPARENCY

(75) Inventors: Marc Lamberton, Antibes (FR); Jean-Jacques Legoll, Cagnes s/Mer (FR); Pascal Thubert, Vence (FR); Eric Levy-Abegnoli, Nice (FR); Pierre Secondo, Tourrettes S/Loup (FR)

(73) Assignee: International Business Machines Corporation, Armonk, NY (US)

( * ) Notice: Subject to any disclaimer, the term of this patent is extended or adjusted under 35 U.S.C. 154(b) by 3592 days.

(21) Appl. No.: 09/654,857

(22) Filed: Sep. 5, 2000

(30) Foreign Application Priority Data

Sep. 23, 1999 (EP) .................................... 99480088

(51) Int. Cl.
*G06F 15/16* (2006.01)
*G06F 15/173* (2006.01)
(52) U.S. Cl. ........ 709/219; 709/201; 709/217; 709/223; 709/227
(58) Field of Classification Search .................. 709/227, 709/203, 105, 230, 229, 246, 207; 370/254; 713/201; 707/200
See application file for complete search history.

(56) References Cited

U.S. PATENT DOCUMENTS

| 5,699,350 | A | * | 12/1997 | Kraslavsky | 370/254 |
| 5,740,361 | A | * | 4/1998 | Brown | 713/201 |
| 5,809,505 | A | * | 9/1998 | Lo et al. | 707/102 |
| 5,845,255 | A | * | 12/1998 | Mayaud | 705/3 |
| 5,867,495 | A | * | 2/1999 | Elliott et al. | 370/352 |
| 6,012,085 | A | * | 1/2000 | Yohe et al. | 709/217 |
| 6,058,480 | A | * | 5/2000 | Brown | 713/201 |
| 6,061,692 | A | * | 5/2000 | Thomas et al. | 707/200 |
| 6,078,943 | A | * | 6/2000 | Yu | 709/105 |
| 6,131,163 | A | * | 10/2000 | Wiegel | 713/201 |
| 6,138,162 | A | * | 10/2000 | Pistriotto et al. | 709/229 |
| 6,226,637 | B1 | * | 5/2001 | Carey et al. | 707/4 |
| 6,301,609 | B1 | * | 10/2001 | Aravamudan et al. | 709/207 |
| 6,421,733 | B1 | * | 7/2002 | Tso et al. | 709/246 |
| 6,477,577 | B1 | * | 11/2002 | Asano | 709/227 |
| 6,529,937 | B1 | * | 3/2003 | Murphy et al. | 709/203 |
| 6,636,504 | B1 | * | 10/2003 | Albers et al. | 370/352 |
| 2002/0059429 | A1 | * | 5/2002 | Carpenter et al. | 709/227 |
| 2003/0140153 | A1 | * | 7/2003 | Lawrence | 709/230 |
| 2003/0212863 | A1 | * | 11/2003 | Ganguly et al. | 711/118 |

OTHER PUBLICATIONS

"Address Allocation for Private Internets" RFC 1597, Mar. 1994.*
"SIP Session Timer", Steve Donovan, Internet Engineering Task Force, Jun. 1999.*
Request for Comments: 1928, *SOCKS Protocol Version 5* by M. Leech, M. Ganis, Y. Lee, R. Kuris, D. Koblas, and L. Jones (Mar. 1996).

* cited by examiner

*Primary Examiner* — Dohm Chankong
*Assistant Examiner* — Angela Widhalm
(74) *Attorney, Agent, or Firm* — Winstead, P.C.

(57) ABSTRACT

In a client-server environment, a method and system are disclosed for granting transparency to the compulsory gateway of an IP network versus client applications run by the end-users connected on the IP network. When client applications have to access, on request of the end-users, server applications beyond the compulsory gateway this latter acts on behalf of them to access the requested remote resources eventually, relaying data between client and server applications. This is achieved without requiring any personalization on client end thus, guarantees that since gateway is becoming transparent to client applications all improvements and modifications brought to the IP network actually fully benefit to all end-users.

12 Claims, 5 Drawing Sheets

SYSTEM AND METHOD FOR IMPROVING GATEWAY TRANSPARENCY

TECHNICAL FIELD

The present invention relates to the Internet and more particularly applies to gateways and proxies used by Internet Service Providers (ISPs) and enterprise networks administrators at the boundary of their networks.

BACKGROUND INFORMATION

The Internet is a worldwide IP network that links many different organizations. The Internet is not a centralized organization but a collection of different networks from various sources, governmental, educational and commercial. Internet routing is done by many Internet providers, government departments and private service companies who establish connections among themselves and build the base of the network. Organizations and individuals connected to the Internet are usually bound to one provider and so may communicate with any other connected organization and individual across the inter-provider routes that are made of expensive communications lines often referred to as 'peer lines'. To cope with the explosion of the Internet over the past years a rapid expansion in bandwidth and other resources deployed by ISPs has been required. To contain their operational costs, ISPs have adopted the use of proxy caching which can significantly reduce bandwidth costs by locally retaining highly used information rather than accessing it from a remote server, through an expensive link, each time it is requested by an end-user (ISP's customers and users). The caching proxy function is also beneficial to the end-user who may thus enjoy good response time. The function is carried out by a proxy server, a Web server, which takes over the responsibility of retrieving Internet data for multiple browser clients. Client requests are sent to the servers through the proxy. In other words, the client has to be configured to send its request to the proxy first, and then it is the proxy that forwards the client's request to the server, acting on behalf of the originating client. The remote Web server does not even see the IP address of the client in the packet headers, but only the IP address of the proxy server. Once the proxy receives the information from the server, it forwards the information to the requesting client. In this way the proxy function can be used to provide address security and optionally, through specific proxy features, to support additional functions, such as request filtering or modification that the service provider may want to implement.

Thus, a traditional proxy server receive requests for URLs (Uniform Resource Locator) from clients and then forwards them to the destination Web server. Those of the retrieved Web documents that are considered to be cacheable according to the Hypertext Transport Protocol (HTTP) are saved. The proxy server can then serve subsequent requests for cached documents from its local cache. Clients get the information faster and network bandwidth utilization is reduced.

Although the proxying technique is advantageous both for the Internet provider, which can thereby limit its bandwidth requirement on peer lines (while the number of Internet users is exponentially growing), and for the clients who get a better response time, it has created problems of two kinds. Firstly, as mentioned here above, the origin IP address of the 30 client is lost in the packet headers received by the servers since the proxy acts as a relay between them. Thus, the traceability of the exchanges is impaired. This may become a serious problem if a wrong doer, a hacker, is attempting to attack a site or tries to disseminate a virus. In such case, the Web site or the end-addressee of a mail, which has been subject to an attack, can only be aware of the proxy address as the origin of the malicious IP packets. This may not be much help if the ISP from which packets have been originated is hosting thousands and sometimes tens or hundreds of thousands of clients. Secondly, having a proxy assumes that the client browsers are personalized for that proxy, the users become proxy-aware, which poses serious scale ability problems when a successful provider wants to grow which, if typical, suggests a growth number in the range often percent (10%) a month. Configuring and re-configuring the end-user browsers can become a cumbersome and costly task that may have severe adverse commercial impacts and, in any case, contributes significantly to increase the administrative cost of managing a network.

As a consequence transparent proxying has been introduced. This technique implicitly assumes that there is a single gateway (or at least a limited number of them) through which all the clients connected to an ISP network or all the users on an intranet are bound to pass through to access the Internet. In practice this assumption holds. For instance, proxy caches, discussed above, need to be placed at gateways to be efficient and other considerations like security tend to limit the access of a sub-network to a single point so it is convenient to watch the traffic flow in both directions. Then, transparent proxying manages to redirect all client sessions passing the gateway to local proxy servers in a fully transparent way. Clients (both users and software i.e., client browsers) do not know their session is handed over to a proxy process: they still think they have a direct connection with the target they specified. To achieve this, transparent proxying relies on port numbers hence, it only works for TCP (Transport Control Protocol) and UDP (User Datagram Protocol) used by higher-layer protocols of the IP suite of protocols such as HTTP i.e., the World Wide Web (or simply the Web) and the Domain Name Service (DNS) protocol. Conceptually, TCP and UDP include also, on top of the IP destination and source addresses of a datagram, a protocol port number, allowing the sender to distinguish among multiple applications programs on the remote machine. Because there are "well-known port numbers", a list of which can be found in RFC 1700 (i.e., a Request For Comment of the Internet Engineering Task Force or IETF) and "privilege ports" (i.e. port numbers below 1023), a router acting as the gateway of a sub-network connected on the Internet can be programmed to intercept e.g. all HTTP requests on port 80, the port number for the applications using this IP protocol. Then, all ETTP requests may be indeed forwarded transparently to a proxy server as requested without having to personalize client browsers. A discussion on this and more can be found in a publication by the International Technical Support Organization of IBM Corporation, P.O. Box 12195, Research Triangle Park, N.C. 27709 U.S.A. under the title '*Web Caching and Filtering with IBM Websphere Performance Pack*', dated March 1999.

Although the above scheme works and is widely used it can become the source of many problems. If a service normally uses a well-known port, that does not mean that it cannot use another port. This must be considered because it might be used to circumvent the gateways restrictions either by an outsider or an insider if, as it is often the case, on top of being just a caching proxy it implements logging, filtering and security functions. Often, weaknesses are not directly created by outsiders, but by insiders who consider the gateway to be unnecessarily restrictive. An insider that wants to provide an outside access that is not permitted may use a nonstandard port in order to do it. For example, if one prevents users from providing HTTP servers but allow connections from outside to non privileged ports (i.e. equal or greater than 1023), a user can provide HTTP access using a port other than 80 thus escaping the transparent proxy server and its logging, filtering and security functions. Also an outside privileged port might be used by an outsider to circumvent the gateway. If, for example, it is allowed from outside to access from TCP port 20 (a port usually used by a File Transfer Protocol or FTP server for data transfer), an outsider may use this port in order to run another service, for example, a Telnet client. Because Telnet is the protocol used to emulate terminal sessions from within the network, like insiders, this may have devastating consequences. Transparent proxying is further illustrated as prior art in FIG. 1.

Another popular approach to implement network gateways uses a proxy server running a networking proxy protocol referred to as SOCKS. This technique enables hosts on one side of the proxy server (e.g., clients) to gain full access to hosts (e.g., servers) on the other side of the proxy server without requiring direct IP reachability. However, SOCKS not only require that protocol be run in the proxy server itself it also assumes that each client is personalized i.e., 'socksified' so as to become able to interact with the proxy server. SOCKS, from which is derived the present invention, is further discussed as prior art in FIG. 2. Thus, it is an object of the invention to overcome the shortcomings, as noted above, of the prior art yet retaining all the advantages of using a transparent proxy function which does not require that end-user or client be personalized whatsoever. It is a further object of the invention not to bind the transparency of a proxy function to the examination of the TCP port from which a service is usually carried out. Further advantages of the present invention will become apparent to the ones skilled in the art upon examination of the drawings and detailed description. It is intended that any additional advantages be incorporated herein.

SUMMARY OF THE INVENTION

The aforementioned needs are addressed by the present invention. Accordingly there is provided, in a first form, a method for providing transparency in a gateway of an IP network. The method includes interrogating a directory comprising data for each end-user of the IP network. Parameters associated with the data for a first end-user are retrieved in response to an access request from a client application of the first end-user. An application server is accessed on behalf of the client application in accordance with the retrieved parameters for the first end-user and data relayed between the client application and the application server.

There is also provided, in a second form, a data processing system for providing a gateway of an IP network. The system includes circuitry operable for interrogating a directory comprising data for each end-user of the IP network. Also contained in the system is circuitry operable for retrieving parameters associated with the data for a first end-user in response to an access request from a client application of the first end-user. Circuitry operable for accessing an application server on behalf of the client application in accordance with the retrieved parameters for the first end-user and operable for relaying data between the client application and the application server is also included.

Additionally, there is provided, in a third form, a computer program product embodied in a tangible storage medium, for providing transparency in a gateway of an IP network. The program product contains a program of instructions for performing a set of method steps that include interrogating a directory comprising data for each end-user of the IP network. Also included is a set of instruction for performing the steps of retrieving parameters associated with the data for a first end-user in response to an access request from a client application of the first end-user and accessing an application server on behalf of the client application in accordance with the retrieved parameters for the first end-user. The program product also contains instructions for performing the step of relaying data between the client application and the application server.

The method and system of the present invention permit client applications to not have to be gateway-aware to be capable of accessing external resources located beyond the gateway of the IP network they are connected to. The present invention permits the gateway to act on behalf of the end-users to access remote server applications through a client agent retrieving end-user parameters from a directory having entries for all end-users of the IP network. This simplifies the task of managing an IP network and ensures that all end-users (since the gateway is transparent to them) are using the facilities network manager may want to put in place to improve, for example, the security and performance of its network while alleviating the burden of having to reconfigure every client application and end-user.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
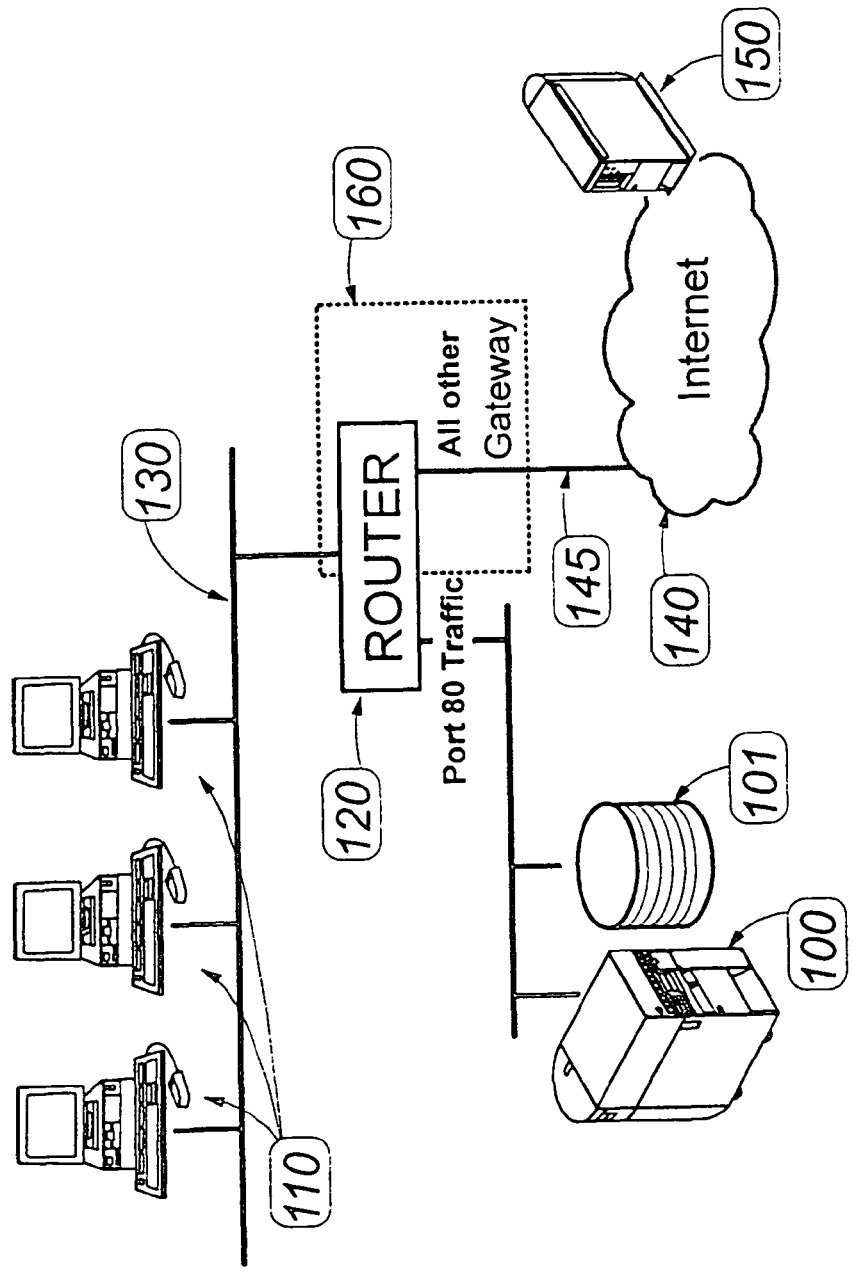
FIG. 1 illustrates a transparent proxy in a network in accordance with the prior art.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 illustrates one form of prior art, transparent proxying, often used to implement an application cache in a proxy server [100], usually having access to mass storage facilities [101], and which avoids having to configure each client browser [110]. The transparent proxying function is carried out from a router [120] which is programmed to divert packets destined to a specified port (e.g., port 80 for HTTP) to the proxy server [100]. The clients are configured so that all the packets they send that are destined for the Internet [140], must pass through the diverting router [120] or, alternatively, the clients network [130], so that router is a choke point through which all outside traffic is bound to go through. Then, router [120] sends all packets destined for the specified port (e.g. port 80 for HTTP) to proxy [100]. The latter intercepts the requests and processes them as usual in a cache; that is, if the content is in the cache, then it just sends the content to the client [110]; otherwise, it retrieves the content from the Web server [150] on the Internet and then sends the content to the client possibly retaining a copy locally for future use. Because of the transparent proxying technique client is never aware that a proxy server is being used and since it does not need to be specially configured to take advantage of the proxying on one hand, all clients benefit, on the average, of a good response time while, on the other hand, network bandwidth utilization over lines [145] used to connect to the Internet is reduced. However, this technique relies on the port number used by protocol to work properly. In practice this may be circumvented which can become the source of problems, especially when security is considered.

Figure 2:
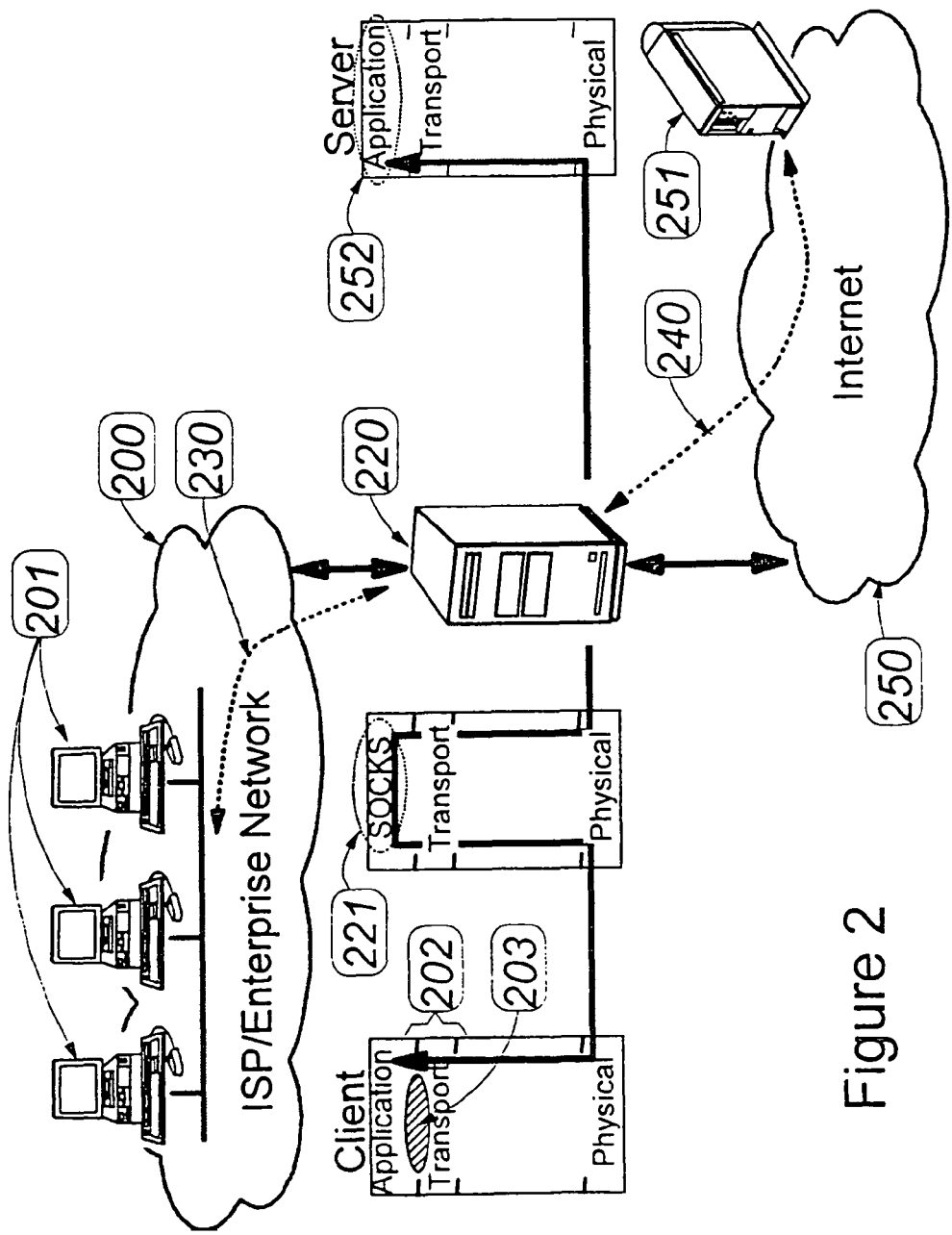
FIG. 2 illustrates a SOCKS proxy system in accordance with the prior art.

FIG. 2 illustrates another prior art mechanism referred to as Sockets Server or simply SOCKS in the literature on IP networks. In this case the gateway of the ISP or Enterprise network [200] is a proxy server [220] i.e., any computer-like machine or work station capable of running the TCP/IP suite of protocols or a subset thereof. Then, SOCKS is a proxy protocol [221] run at the application level on a proxy server. From the application server's [252] perspective, the proxy server becomes the client. When an end client [201] wants to make a connection to an application running on a server [251] through the Internet [250], the client connects to the proxy server [220]. The application server's address and port number are passed to the proxy server via a proxy protocol. The proxy server [220] then connects to the application server [252]. Once the connection [240] to the application server is established, the proxy server relays data between the client and the application server.

Currently, there are two versions of the SOCKS protocol, version 4 and version 5. The SOCKS version 4 protocol is referred to as "SOCKS V4". Similarly, the SOCKS version 5 protocol is referred to as "SOCKS V5" whose specifications are laid out in RFCs i.e., Request For Comments of the Internet Engineering Task Force or IETF, 1928 (SOCKS Protocol Version (5) and 1929 (Username/Password Authentication for SOCKS V5).

Because of its simplicity and flexibility, SOCKS has been widely used providing for transparent network access across firewalls, easy deployment of authentication/encryption methods, rapid deployment of new network applications, simple extension of network security policy and flexible network traffic screening/filtering. However, all these advantages are obtained at the expense of a complication on the client side. This is due to the modifications required on the protocol stack [202] of the client machines [201]. The protocol stack, on each client machine, must be 'socksified' so as to be able to interact with the SOCKS [221] of the proxy server [220] in order to carry out, in the proxy server, functions already mentioned above such as authentication, filtering and address translation. Moreover, the client is also required to configure the SOCKS server address and location so that the socksified stack and the application on top of it will be directed to the SOCKS server prior to being relayed to the application server. In practice SOCKS includes two primary components, the SOCKS server i.e., software running at the application level [221] on a proxy server, and the SOCKS client library, i.e., software between the client's application and transport layers in the client machine [203].

Thus, despite of all its advantages, SOCKS fails meeting an important concern of network administrators which is that, ideally, the end user should not be affected by the solutions adopted to administrate and run a network.

Figure 3A:
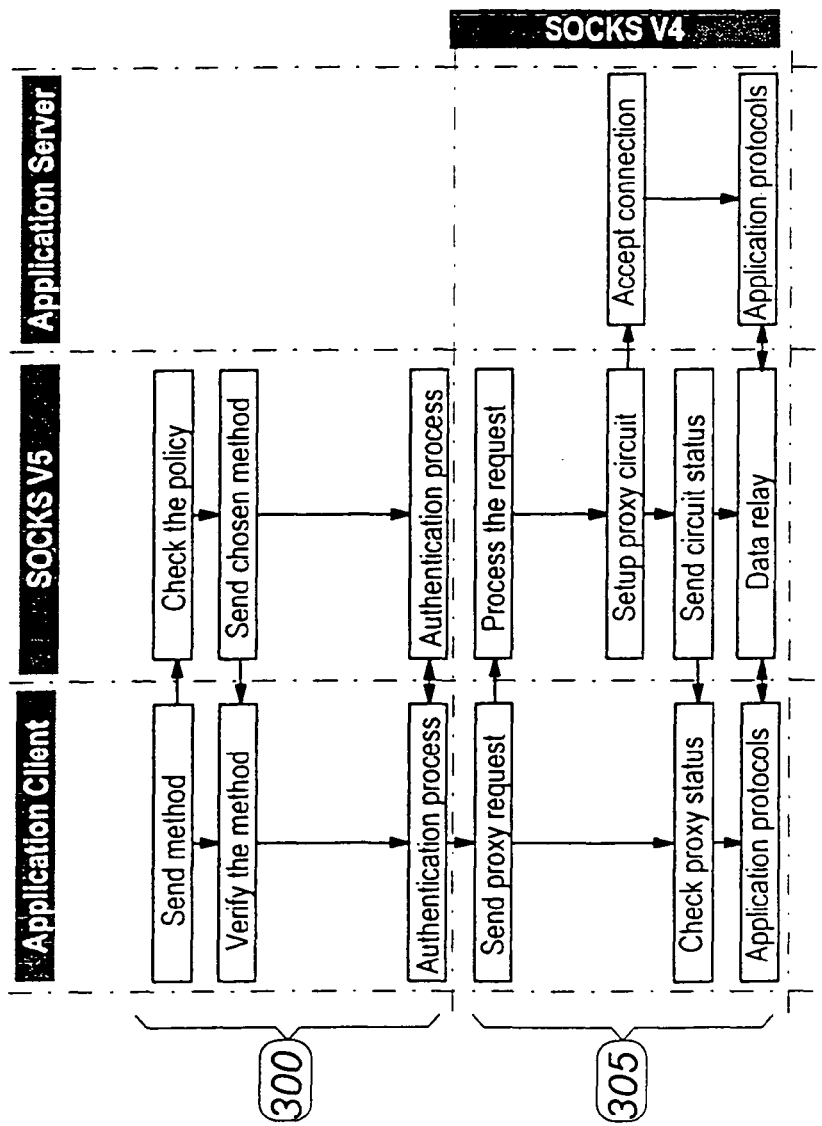
FIG. 3a illustrates a dataflow in SOCKS in accordance with the prior art.
Figure 3B:
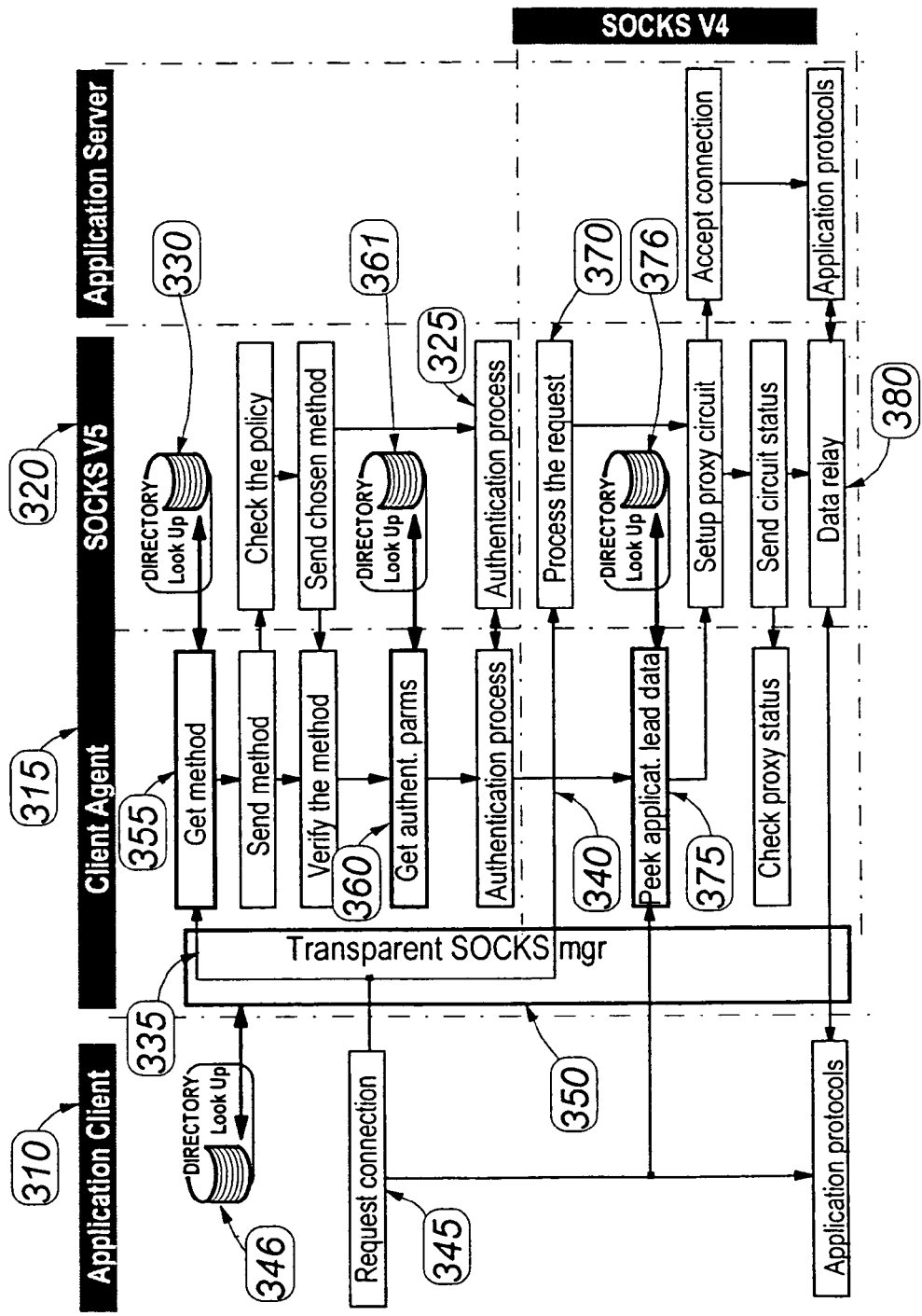
FIG. 3b illustrates a dataflow in transparent SOCKS in accordance with the present invention.

FIG. 3 illustrates the principles of the invention. FIG. 3(a) is, for the sake of clarity, the control flow of SOCKS Versions 4 and 5. The chief difference between the two versions is that Version 5 of SOCKS adds authentication [300] to Version 4 [305]. The mechanism of the present invention, illustrated in FIG. 3(b), rather than performing the SOCKS protocol between client [310] and SOCKS server [320], which requires that each client be 'socksified', includes an agent [315], at the SOCKS server, playing the client's role on behalf of the client. Then, processes like authentication [325] takes place between this agent and a subscriber directory or database (e.g., [361]) where policies and generally all parameters specific to clients were previously stored. Hence, an initial connection request [345] from a client, captured by the transparent SOCKs manager [350], triggers an interrogation of the directory [346] which determines first what version of SOCKS client uses. Depending upon the result of this first interrogation client, the request is directed to SOCKS V5 agent [335] or SOCKS V4 agent [340]. When SOCKS V5 agent is selected, the directories [330] and [361] are interrogated again to find what methods [355] are used by client and what kind of authentication parameters [360] are set. Then, (this is however the first step if SOCKS V4 was selected earlier), client agent [315] passes the request to the SOCKs server [320] which starts processing the connection request [370]. At this point, leading part of client's application data [375] may already have been obtained so that it can be thoroughly examined. This step, although optional, and which can be carried out at various levels of sophistication, opening the door to many possibilities that were not possible with standard SOCKS such as implementing a proxy cache for certain types of applications, for example HTTP previously described in FIG. 1 in conjunction with transparent proxying. The leading part of the application data, which contains the headers of the protocols in use, can thus be examined and parsed to retrieve, through a further interrogation of the directory [376], all information necessary to process the application data and application protocols used. For example, transparent SOCKS may thus determine what server (local, remote or none if request cannot be honored) is best suited, when several possibilities exist, to serve client requests and to keep using it consistently while the client session is on. Then, under normal circumstances, the SOCKS server establishes the connection with the application server and sends a circuit status to the SOCKS agent (which, however, has the freedom of resetting the connection with the client if something unexpected occurs on application server side). Finally, the SOCKS server establishes the data relay [380] between the application server and the client. This client is not aware that it is actually dealing with a transparent SOCKS and need not be configured.

However, it is worth reemphasizing that the principles of the invention work under the assumption (which holds in practice) that transparent SOCKS is installed at the gateway of a network which must be a choke point for all in and out traffic just as in the transparent proxy described in FIG. 1. Thus, connection requests [345] issued by the clients towards the application server (regardless of the destination IP address) all reach transparent SOCKS and are accepted by it. During the last interrogation [376] of the directory the destination to best serve the request is determined. On the way from the SOCKs server to the application server, the SOCKS server may use the IP address of the client, on behalf of the client, to represent the client vis-a-vis the application server, transparently. Because the SOCKS server logically binds two TCP connections (client to SOCKS and SOCKS to application server), and since it is on the path between client and application server, it can determine at any time which flow on one side is associated with which flow on the other side keeping all transactions between clients and servers consistent.

Therefore, the present invention allows a complete transparency when it is convenient to do so. Considering again FIG. 2 in which the proxy server now runs the transparent SOCKS per the invention, and if network [200] is that of an ISP serving individual customers, this latter may decide to open connections like [240] by inserting as the source address the actual IP address of the originator of the request (and not the IP address of the gateway [220]) so that, in case of a problem the end application targeted by a client of the ISP network [200] may better pinpoint the actual origin of the request beyond network gateway [220]. Still, the opposite is possible simultaneously. In which case, transparent SOCKS, may be programmed so that it hides internal IP addresses for some protocols, or a subset of clients using a certain application protocol, in order to keep their privacy or e.g., for security considerations.

Thus, the invention allows complete flexibility with respect to the way client requests from an ISP/Enterprise network are processed and does not require that clients become gateway-aware which guarantees that the solutions put in place by network administrators to improve their networks (response times, costs etc.) are actually effective for all end clients.

Figure 4:
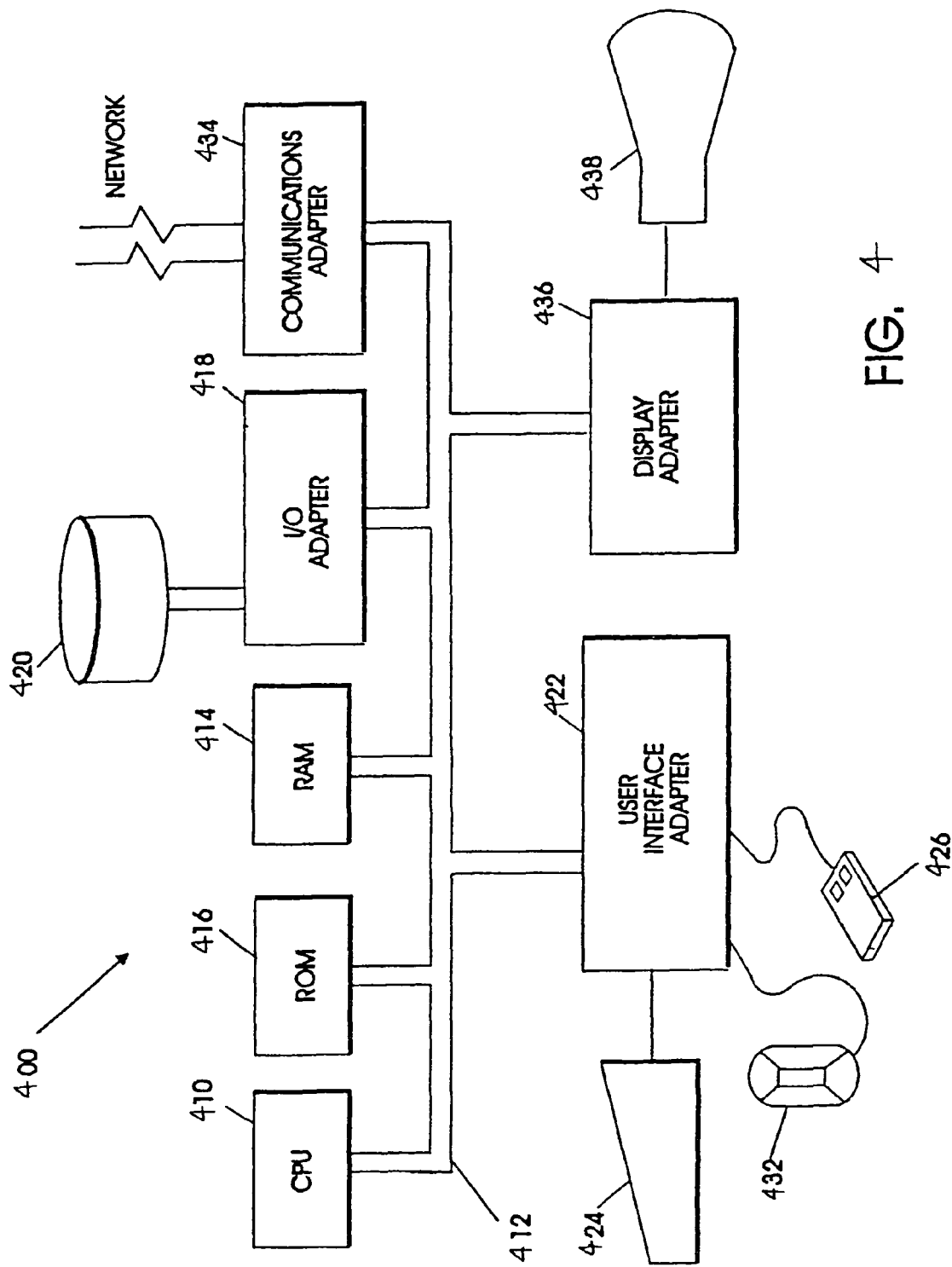
FIG. 4 illustrates, in block diagram form, a data processing system implemented in accordance with an embodiment of the present invention.

Referring now to FIG. 4, an example is shown of a data processing system 400 which may be used for the invention. The system has a central processing unit (CPU) 410, which is coupled to various other components by system bus 412. Read only memory ("ROM") 416 is coupled to the system bus 412 and includes a basic input/output system ("BIOS") that controls certain basic functions of the data processing system 400. Random access memory ("RAM") 414, I/O adapter 418, and communications adapter 434 are also coupled to the system bus 412. I/O adapter 418 may be a small computer system interface ("SCSI") adapter that communicates with a disk storage device 420. Communications adapter 434 interconnects bus 412 with an outside network enabling the data processing system to communicate with other such systems. Input/Output devices are also connected to system bus 412 via user interface adapter 422 and display adapter 436. Keyboard 424, track ball 432, mouse 426 and speaker 428 are all interconnected to bus 412 via user interface adapter 422. Display monitor 438 is connected to system bus 412 by display adapter 436. In this manner, a user is capable of inputting to the system throughout the keyboard 424, trackball 432 or mouse 426 and receiving output from the system via speaker 428 and display 438.

Preferred implementations of the invention include implementations as a computer system programmed to execute the method or methods described herein, and as a computer program product. According to the computer system implementation, sets of instructions for executing the method or methods are resident in the random access memory 414 of one or more computer systems configured generally as described above. Until required by the computer system, the set of instructions may be stored as a computer program product in another computer memory, for example, in disk drive 420 (which may include a removable memory such as an optical disk or floppy disk for eventual use in the disk drive 420). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Finally, those skilled in the art will recognize that the building and managing a directory of end clients in the transparent SOCKS, containing all the permanent or dynamic information (e.g., the temporary IP address assigned by ISP to their clients for the duration of a session) necessary to carry out the invention, requires only standard techniques and products. The directory may be organized in many different ways while remaining within the scope of the invention.

Although the present invention and its advantages have been described in detail, it should be understood that various changes, substitutions and alterations can be made herein without departing from the spirit and scope of the invention as defined by the appended claims.

What is claimed is:

1. In a client-server environment, a method for providing transparency in a gateway of an IP network comprising the steps of:
    interrogating a directory comprising proxy server protocol data specific to every end-user network account of said IP network;
    retrieving parameters associated with said proxy server protocol data for a first end-user in response to an access request from a client application of said first end-user;
    accessing an application server on behalf of said client application in accordance with said retrieved parameters for said first end-user;
    relaying data between said client application and said application server;
    updating, in said gateway of said network, the directory of said end-users, said step of updating the directory including the steps of:
        disabling entries for those of said end-users that disconnect;
        enabling entries for those of said end-users that connect; and
        updating said entries of said end-users comprising dynamic parameters whenever said parameters are changing while connected.

2. The method according to claim 1 further comprising the step of:

creating, in said gateway of said IP network, the directory including entries specific to every end-user network account on said IP network.

3. The method according to claim 1 wherein the step of retrieving parameters associated with proxy server protocol data for said first end-user includes the steps of:
   obtaining leading data from said client application having issued said access request for said end-user;
   parsing said leading data;
   determining a protocol said client application is currently using;
   interrogating said directory at an entry corresponding to said first end-user;
   retrieving parameters associated with said protocol; and
   executing said protocol in accordance with said parameters associated with said protocol.

4. The method according to claim 1 further including the step of informing said end-user of said client application that a server application is unavailable if a link to said application server is not established.

5. A data processing system for providing a gateway of an IP network, comprising:
   circuitry operable for interrogating a directory comprising proxy server protocol data specific to every end-user network account of said IP network;
   circuitry operable for retrieving parameters associated with said proxy server protocol data for a first end-user in response to an access request from a client application of said first end-user;
   circuitry operable for accessing an application server on behalf of said client application in accordance with said retrieved parameters for said first end-user; and
   circuitry operable for relaying data between said client application and said application server;
   circuitry operable for updating, in said gateway of said network, the directory of said end-users, said circuitry operable for updating the directory including:
      circuitry operable for disabling entries for those of said end-users that disconnect;
      circuitry operable for enabling entries for those of said end-users that connect and
      circuitry operable for updating said entries of said end-users comprising dynamic parameters whenever said parameters are changing while connected.

6. The system according to claim 5 further comprising:
   circuitry operable for creating, in said gateway of said IP network, the directory including entries specific to every end-user network account on said IP network.

7. The system according to claim 5 wherein the circuitry operable for retrieving parameters associated with said end-user for said access request from said client application includes:
   circuitry operable for obtaining leading data from said client application having issued said access request for said end-user;
   circuitry operable for parsing said leading data;
   circuitry operable for determining a protocol said client application is currently using;
   circuitry operable for interrogating said directory at an entry corresponding to said first end-user; and
   circuitry operable for retrieving parameters associated with said protocol; executing said protocol in accordance with said parameters associated with said protocol.

8. The system according to claim 5 further including the circuitry operable for informing said end-user of said client application that a server application is unavailable if a link to said application server is not established.

9. A computer program product embodied in a tangible storage medium, the program product for providing transparency in a gateway of an IP network, the program product including a program of instructions for performing the steps of:
   interrogating a directory comprising proxy server protocol data specific to every end-user network account of said IP network;
   retrieving parameters associated with said proxy server protocol data for a first end-user in response to an access request from a client application of said first end-user;
   accessing an application server on behalf of said client application in accordance with said retrieved parameters for said first end-user; and
   relaying data between said client application and said application server;
   updating, in said gateway of said network, the directory of said end-users, said step of updating the directory including the steps of:
      disabling entries for those of said end-users that disconnect;
      enabling entries for those of said end-users that connect; and
      updating said entries of said end-users comprising dynamic parameters whenever said parameters are changing while connected.

10. The computer program product according to claim 9, further comprising instructions for performing the step of:
   creating, in said gateway of said IP network, the directory including entries specific to every end-user network account on said IP network.

11. The program product according to claim 9 wherein the step of retrieving parameters associated with said end-user for said access request from said client application includes the steps of:
   obtaining leading data from said client application having issued said access request for said end-user;
   parsing said leading data;
   determining a protocol said client application is currently using;
   interrogating said directory at an entry corresponding to said first end-user;
   retrieving parameters associated with said protocol; and
   executing said protocol in accordance with said parameters associated with said protocol.

12. The program product according to claim 9 further including instructions for performing the step of informing said end-user of said client application that a server application is unavailable if a link to said application server is not established.

* * * * *